Jan. 27, 1942.    M. W. DITTO ET AL    2,270,869
SEWAGE TREATING METHOD AND APPARATUS
Filed Jan. 18, 1940    2 Sheets-Sheet 1
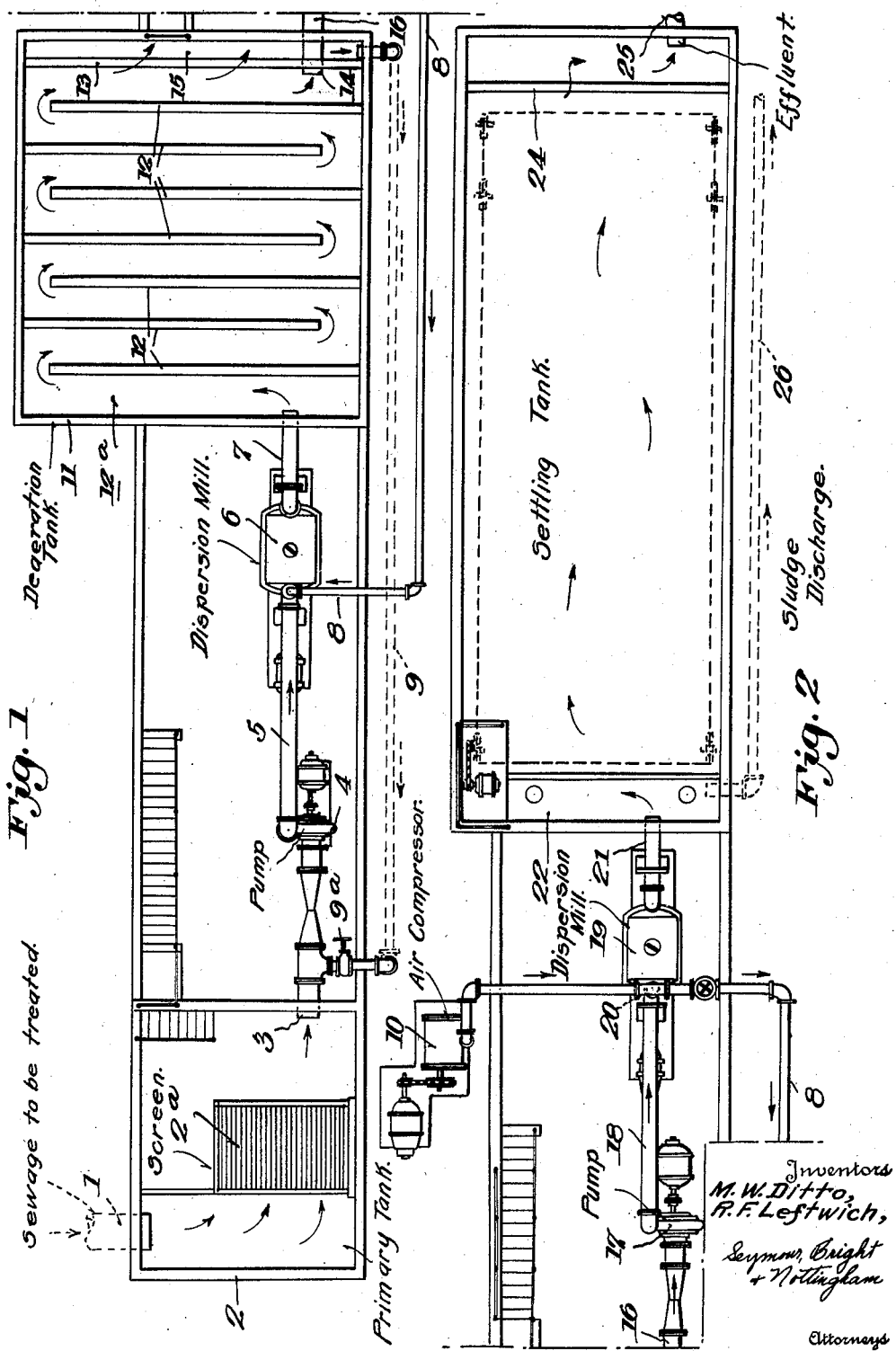

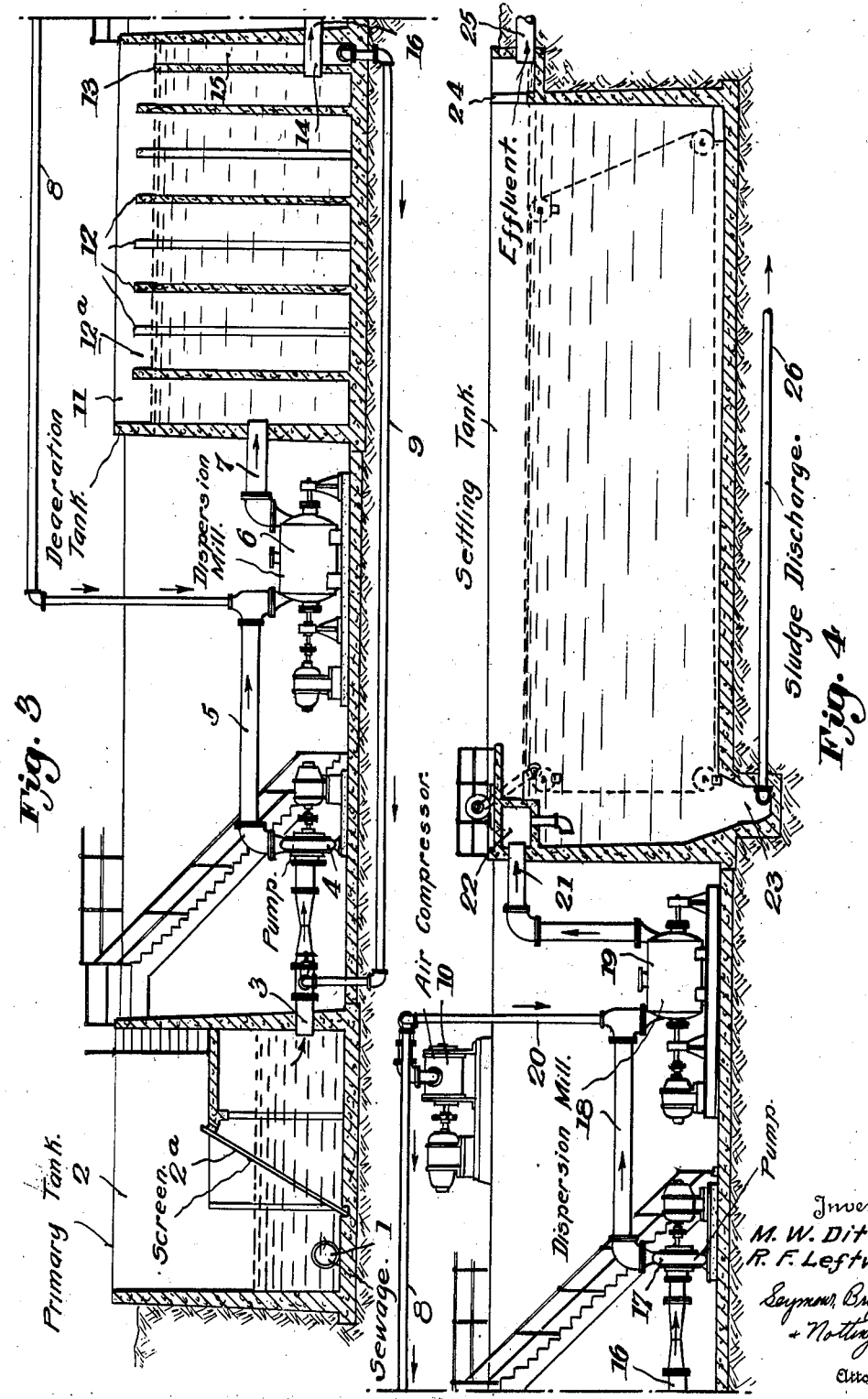

Patented Jan. 27, 1942

2,270,869

UNITED STATES PATENT OFFICE 2,270,869

SEWAGE TREATING METHOD AND APPARATUS

Marvin W. Ditto and Robert F. Leftwich, New York, N. Y., assignors to Emulsions Process Corporation, New York, N. Y., a corporation of Delaware Application January 18, 1940, Serial No. 314,520

7 Claims. (Cl. 210—8)

This invention relates to treatment and final disposal of domestic and industrial waste collected in the sanitary sewer systems of communities, industrial plants, etc., and commonly referred to as "sewage."

It is well recognized that agitation and aeration of sewage by various means, such as employed in the activated sludge process, accomplish a satisfactory degree of purification of the effluent, and preparation of sludge for final disposal. However, the long periods of treatment and extensive apparatus required by existing processes for agitation and aeration, result in large investments in plants and equipment.

The activated sludge system of sewage treatment generally requires a primary sedimentation period in tanks of from ½ to 1 hour duration. In these primary tanks the grease and/or oil is usually skimmed from the surface of the sewage and a primary sludge is collected from sewage concentrated in the lower strata. The intermediate strata of sewage is then pumped into channels where the sewage flows and is agitated to prevent any sedimentation. Agitation and aeration in these channels is accomplished by pumping large quantities of air into and diffusing it throughout the sewage. The period of flow of the sewage in the aeration channels is from 5 to 6 hours. At the end of such activation period, a certain portion, usually 25 to 30 per cent of the treated sewage is returned to the incoming raw sewage for inoculation or stimulation of bacterial activity. The balance of the treated sewage is pumped to final settling tanks where after a detention period of 2½ hours the final effluent is discharged over weirs, and the sludge pumped from the bottom of the tank. This final sludge usually runs about 98% moisture and is disposed of by various methods.

The total elapsed time between reaching the plant and leaving the final settling tanks averages about 8 to 9 hours.

Curves have been plotted to show the biochemical oxygen demand and suspended solids reduction for various periods of detention in sedimentation tanks and treatment by activation, and it has been found that BOD reduction by sedimentation is not very effective after ½ to 1 hour and that activation continues this reduction until at the end of 5 to 6 hours, 93% reduction has been accomplished. This indicates the necessity of supplying oxygen to complete the treatment and cause concentration of the biologically active mass. The degree and rate of this concentration is in proportion to the rate of application of organic food supply.

Yearly and longer averages covering a number of activated sludge plants show that the raw sewage has a BOD of 200 p. p. m. and suspended solids of 200 p. p. m. and that over this 8½ hour average treatment period, a reduction in BOD of 92½% and in suspended solids a reduction of 91% has been accomplished.

To accomplish this treatment by activation and aeration, the air requirements vary from 0.75 to 1.2 cubic feet per gallon of sewage. Only about 5 to 10% of the air supply is effective in furnishing oxygen, the balance is necessary for agitation.

There are other methods of accomplishing the above results by use of chemicals, but in both cases the costs of treatment are high and investments in plants excessive.

The primary object of our invention is to provide an improved method of sewage treatment which will accomplish a greater degree of purification of effluent from the sewage and leave a residual sludge of low moisture content to be finally disposed of.

Another purpose is to supply a novel method which may be practiced in plants of relatively small size and much more expeditiously than by the known processes.

In accordance with our invention, a dispersion mill preferably of the type disclosed in the application of M. W. Ditto, Serial No. 281,484, filed June 27, 1939, is used, to finely disperse air or oxygen throughout the sewage under superatmospheric pressure while maintaining a velocity through the mill equal to the flow of incoming sewage, which is at a minimum rate, such as 10 ft. per second. Afterwards, the sewage with its admixture of air from the dispersion mill is introduced into an open tank at atmospheric pressure, where the gaseous products of oxidation and excess air are allowed to escape. This sequence of operations is repeated until sufficient oxygen has been supplied to the sewage to effect a satisfactory reduction in biochemical oxygen demand, suspended solids and bacteria count.

With the hereinbefore mentioned objects indicated and with other purposes in view which will appear as the description proceeds, the invention consists in the novel features and steps hereinafter described in connection with the accompanying drawings and more particularly pointed out in the appended claims.

In the drawings:

Fig. 1 is a top plan view of the first portion of the apparatus.

Fig. 2 is a similar view of the second or final portion of the same.

Fig. 3 is a vertical sectional view of the first portion of the apparatus, partly in elevation.

Fig. 4 is a similar view of the final portion of the apparatus.

The apparatus comprising our plant will be described in conjunction with the method of operation of same.

The drawings not only illustrate the pieces of equipment, but indicate steps in our process for treating sewage, from the receipt of raw sewage to discharging of final effluent and sludge from the ultimate settling tank. In this system, 1 indicates the sewer delivering raw sewage to a primary receiving tank 2. We have indicated this primary tank as a simple receptacle containing a screen 2a composed of vertical bars spaced for coarse screening, which spacing is usually from 3 to 4". These tanks are usually equipped with a float arrangement (not shown) for controlling the speed of the pumping equipment, in order to maintain a constant level and compensate for the variation in flow of incoming sewage. It is also common practice to provide a primary settling tank where a short detention period affords an opportunity to remove the scum from the surface and separate a primary sludge from the bottom of incoming raw sewage accumulated in the tank. We do not express preference for either system of handling incoming raw sewage and our process can operate in conjunction with either, however, we have illustrated this simple type of primary tank as a means of indicating the functioning of a complete plant incorporating our process for sewage treatment.

From primary tank 2, sewage is forced through pipes 3 and 5, by pump 4, into dispersion mill 6. Through pipe 9, recycled sewage is circulated in a predetermined proportionate amount, controlled by valve 9a, by pump 4, to be mixed with the raw incoming sewage in dispersion mill 6.

In dispersion mill 6, the sewage will be broken into infinitesimal particles which will be brought into intimate contact with a suitable oxygen-containing fluid, such as air, furnished through pipe 8, by means of compressor 10, as indicated. The quantity of air furnished in proportion to sewage will be in the ratio approximately of ½ part air to 1 part sewage by volume. Due to the fine dispersion of air, less air is required per gallon of sewage undergoing treatment than is required in an open tank where percolation is used. This air will be sufficient to supply the biochemical oxygen demand until all nutrients serving as bacteria food are consumed.

The dispersion mill is ample in size to provide time to thoroughly disperse the given quantity of air throughout the sewage. Both sewage and air are supplied to the dispersion mill under greater than atmospheric pressure, and superatmospheric pressure is maintained within the mill. The sewage with its admixture of dispersed air is carried by pipe 7 into channel 12a of deaeration tank 11. By discharging the sewage admixture from a confined zone of superatmospheric pressure in the dispersion mill into an open tank at atmospheric pressure, gaseous products of oxidation of organic matter, such as carbon dioxide and nitrogen, with the admixed excess air, escape from the sewage. In tank 11, the sewage is caused to flow through a circuitous or zig-zag channel 12a formed by oppositely extending vertical partitions 12. The dimensions of the channel are such that sewage will be caused to flow at velocities sufficient to prevent settling out of the solids of the sewage. At the discharge end of tank 11, partition 13 forms a weir over which the less concentrated strata of sewage is discharged into an outlet channel 15. The more concentrated sewage will be discharged from the lower portion of the outlet end of channel 12a through an opening 14 in pipe 16. The residual or bottom strata of sewage in tank 11 from which the air has been eliminated and in which bacteria have been allowed to multiply until they have reached a self-imposed upper limit of concentration, is drawn by pump 17 through pipe 16 and forced through 18, into a second dispersion mill 19. In this mill, a quantity of an oxygen-containing gas, such as air, supplied by pipe 20, from compressor 10 is dispersed throughout the sewage. At the same time that air is being dispersed in the sewage by mill 19, the concentrated growth of bacteria is being broken up and dispersed in order that they may feed on the nutrient provided by oxygen from the new air supply. The amount of air supplied at this point will be in the ratio of approximately ½ part air to 1 part sewage by volume. The dispersed mixture of sewage and air in dispersion mill 19 is maintained at superatmospheric pressure.

From mill 19, the admixture of previously treated sewage with a fresh air supply is discharged through pipe 21 into the final settling tank 22. In this tank, the gaseous products of secondary oxidative work and excess air are discharged from the sewage as it flows from a superatmospheric pressure in dispersion mill 19 into the open tank at atmospheric pressure. In the final settling tank 22, which may be of the type illustrated or any other suitable tank for separating the final effluent from the sludge, the final effluent flows over weir 24 and is discharged through pipe 25. The final sludge is discharged from sump 23 through pipe 26.

The sewage is allowed to settle in this final settling tank until there is a concentration of sludge in the lower portion of the tank. This period of detention will be considerably less than the 2½ hour average detention period in the final settling tanks of known processes. As a result of secondary dispersion in mill 19, we break down the concentrated bacterial growth and reduce the percentage of colloid matter which tends to remain dispersed throughout the weaker upper strata of sewage in the final settling tank. By decreasing this population of dispersed or suspended matter, we are able to effect sedimentation much more rapidly and at the same time the additional air, furnished in this secondary stage of treatment in dispersion mill 19, will further reduce the biochemical oxygen demand and permit more rapid discharge of the effluent from the final settling tank 22.

During this treatment period, oxygen supplied by dispersed air causes the development of an active biological material; the basis of which is a bacterial zoogloea. This active mass composed of plant and animal organisms, including protozoa, has a highly adsorptive property for dissolved organic matters of sewage. The concentration of this biologically active mass varies with the rate of organic food supply and is independent of the physical structure in which it is carried on, so long as it provides the necessary means for effecting an intimate admixture of the active material, organic food and oxygen. In the dispersion mill used by us, we bring about this intimate admixture to promote the oxidative work with great rapidity and with a minimum amount of excess air, before releasing the admixture to atmospheric pressure in open channels so that gaseous products of the oxidative work will be released. In these channels, the short detention period permits a certain degree of stratification, providing an opportunity to separate the lower strata of sludge where the less biologically active material has been concentrated from the upper strata of more thoroughly dispersed and still active biological matter. This upper strata containing a dispersed population of active zoogloea, as has been indicated, flows over weir 13 and is pumped through pipe 9, for remixing with the raw sewage and air in dispersion mill 6. The lower strata containing the less active mass of bacterial growth is pumped, as indicated, through pipes 16 and 18 to dispersion mill 19.

The active biological matter developed by treatment in dispersion mill 6 and deaeration tank 11 is highly adsorptive to the organic matters of the sewage, having an agglutinating or flocculating property, such that sewage intimately exposed to it is freed of its dissolved and suspended impurities. A degree of oxidative work is accomplished in this stage to cause a certain portion of the organisms to feed and develop until they have reached a self-imposed limit of concentration when they become inactive and stratify in the lower portion of the sewage. In dispersion mill 19, these self-imposed concentrated organisms are broken down and dispersed throughout the sewage and with the fresh supply of air, furnishing oxygen for production of nutrient for bacterial feeding, provides a second stage of treatment with rejuvenated organisms to further reduce the dissolved and suspended impurities in the sewage. A detention period in the final tank 22 is afforded to release gaseous products of oxidation and stratify the sewage into final effluent and sludge.

From the point of view of the end result, the reaction in sewage treatment, as we propose it, is oxidation of organic matter to water, carbon dioxide and oxidized nitrogen, leaving some inert matter which is highly carbonaceous and does not serve as bacterial food.

We accomplish in our process a rate of oxidation many times the normal rate, by supplying oxygen in a highly intimate interfacial relation to organic matter which produces the nutrient for bacteria in the sewage to feed upon. We allow this bacteria to multiply without restriction until they reach self-imposed upper limits of concentration, at which limit they can no longer bring their metabolic activity into balance with the food supply. This concentrated population of inactive bacteria is segregated by stratification in aeration tanks before further reduction of concentration by mechanical dispersion with air supplying oxygen for further feeding of the rejuvenated and active bacteria. By returning a certain proportion of the sewage in which the bacteria have not become concentrated and are still starving for food, a stimulation of the activity of the bacteria in the raw sewage is accomplished.

The superatmospheric pressure maintained in the mills 6 and 19 will vary depending on the heighth to which the material is pumped, friction in the lines, etc., but in most cases, we will employ a superatmospheric pressure in the mills of 15 pounds or more per square inch above atmospheric. Of course, these mills will preferably be of the type disclosed in said Ditto application Serial No. 281,484.

Instead of using air in the system, we can, of course, employ pure oxygen or any suitable gas containing sufficient oxygen for our purposes.

A plant to practice our method will require a minimum of space and small capital investment. The operating expense will be low due to efficient dispersion of air or the like throughout the sewage, substantially reducing the oxygen requirements and replacing inefficient agitation by air.

While we have disclosed what we now consider to be a preferred embodiment of the apparatus and steps of the procedure, it will be apparent to those versed in the art that changes may be made in the details without departing from the spirit of the invention as expressed in the claims.

What we claim and desire to secure by Letters Patent is:

1. In the treatment of sewage, forcing sewage from a source of supply under superatmospheric pressure through a tubular passageway into the lower portion of a pool of sewage spaced from the source of supply, introducing an oxygen-containing fluid under superatmospheric pressure into the sewage as it flows through the passageway, subjecting the admixture of sewage and oxygen-containing fluid as it passes through said passageway to violent turbulence, impact and shear, and thereby breaking solids of the sewage into infinitesimal particles and finely dispersing the oxygen-containing fluid in the sewage, subjecting the surface of the pool to substantially atmospheric pressure to allow oxygen-containing fluid and gaseous products of oxidative work to freely escape from the sewage in the pool, and then passing the admixture from the pool through a deaeration channel with sufficient velocity to dioxide, nitrogen and excess oxygen to escape from the admixture.

2. In the treatment of sewage, forcing sewage from a source of supply under superatmospheric pressure through a tubular passageway into the lower portion of a pool of sewage spaced from the source of supply, introducing an oxygen-containing fluid under superatmospheric pressure into the sewage as it flows through the passageway, subjecting the admixture of sewage and oxygen-containing fluid as it passes through said passageway to violent turbulence, impact and shear, and thereby breaking solids of the sewage into infinitesimal particles and finely dispersing the oxygen-containing fluid in the sewage, subjecting the surface of the pool to substantially atmospheric pressure to allow oxygen-containing fluid and gaseous products of oxidative work to freely escape from the sewage in the pool, and then passing the admixture from the pool through a deaeration channel with sufficient velocity to prevent settling of solids while allowing carbon dioxide, nitrogen and excess oxygen to escape from the admixture, passing the sewage after it leaves the deaeration channel into a tank, where it is permitted to stratify into a lower concentrated strata and an upper less concentrated strata, and returning a portion of the upper strata to the first step of the method.

3. In the treatment of sewage, simultaneously introducing air into raw sewage and breaking up the sewage into infinitesimal particles in intimate contact with the air while maintaining the sewage and air under superatmospheric pressure, the air present being sufficient to supply the biochemical oxygen demand, organizing the resulting admixture into a flowing stream from which carbon dioxide, nitrogen and excess air and other gaseous products of oxidative work are permitted to escape while the admixture travels with sufficient velocity to prevent settling of solids, permitting a portion of the stream to stratify into an upper strata of less concentrated sewage and a lower strata of more concentrated sewage, recycling a portion of the sewage from the less concentrated upper strata to the first step of the process, mixing air under superatmospheric pressure with the more concentrated strata and then violently agitating the resulting admixture to break up the concentrated growth of bacteria and finely disperse the air in the sewage, discharging the resulting admixture into a settling tank, discharging gaseous products of secondary oxidative work from the upper portion of such tank, concentrating sludge in the lower portion of said tank, and discharging a final effluent from the upper portion of the sewage in said tank.

4. In the treatment of sewage, pumping raw sewage and a proportionate quantity of air for oxygen supply, into a tubular passageway, dispersing the air throughout the raw sewage in the passageway under superatmospheric pressure to such an infinite degree that a rapid development of active biological matter having a high adsorbptive property for organic impurities in sewage is obtained, permitting bacterial feeding and growth to take place until an upper limit of self-imposed concentration is reached where they can no longer bring their metabolic activity into balance with the food supply, discharging the admixture from the passageway into a deaeration tank maintained under substantially atmospheric pressure, allowing sewage to remain in the deaeration tank for a sufficient length of time for the gaseous products of oxidative work to escape, pumping the lower strata of sewage, in which there is a concentration of inactive bacterial growth, from said tank into a second passageway, dispersing such concentrated bacterial growth under superatmospheric pressure with a fresh supply of air in the second passageway while permitting a secondary oxidative work to take place in the second passageway, returning sewage from the upper strata in the deaeration tank to the inlet of the first passageway to inoculate and stimulate feeding of the raw sewage organisms, discharging the admixture from the second passageway into a final settling tank maintained at substantially atmospheric pressure, discharging the gaseous products of the secondary oxidative work from the sewage in the final settling tank while the final effluent flows from the upper portion of the sewage in that tank and the sludge is discharged from the bottom portion of the final settling tank.

5. A sewage treating apparatus comprising a plurality of tanks, a tubular passageway placing said tanks in communication, a pump interposed in the passageway for forcing fluid through the passageway from one tank to the other, a dispersion mill interposed in the passageway at the downstream side of the pump, and means for forcing a gas under pressure into said passageway between the pump and the dispersion mill.

6. A sewage treating apparatus comprising tanks, a tubular passageway placing said tanks in communication, a pump interposed in the passageway for forcing fluid through the passageway from the first tank to the second tank, a dispersion mill interposed in the passageway at the downstream side of the pump, means for forcing a gas under pressure into said passageway between the pump and the dispersion mill, a weir in the second tank forming with the second tank a compartment, and a conduit placing the lower portion of the compartment in communication with the passageway at the upstream side of the pump.

7. In the treatment of sewage, simultaneously introducing air into raw sewage and breaking up the sewage into infinitesimal particles in intimate contact with the air while maintaining the sewage and air under superatmospheric pressure, the air present being sufficient to supply the biochemical oxygen demand, organizing the resulting admixture into a flowing stream from which carbon dioxide, nitrogen and excess air and other gaseous products of oxidative work are permitted to escape while the admixture travels with sufficient velocity to prevent settling of solids, permitting a portion of the stream to stratify into an upper strata of less concentrated sewage and a lower strata of more concentrated sewage, mixing air under superatmospheric pressure with the more concentrated strata and then violently agitating the resulting admixture to break up the concentrated growth of bacteria and finely disperse the air in the sewage, discharging the resulting admixture into a settling tank, discharging gaseous products of secondary oxidative work from the upper portion of such tank, concentrating sludge in the lower portion of said tank, and discharging a final effluent from the upper portion of the sewage in said tank.

MARVIN W. DITTO.
ROBERT F. LEFTWICH.

CERTIFICATE OF CORRECTION.

Patent No. 2,270,869. January 27, 1942.

MARVIN W. DITTO, ET AL.

It is hereby certified that error appears in the printed specification of the above numbered patent requiring correction as follows: Page 3, second column, line 43, claim 1, before "dioxide" insert --prevent settling of solids while allowing carbon--; and that the said Letters Patent should be read with this correction therein that the same may conform to the record of the case in the Patent Office.

Signed and sealed this 14th day of April, A. D. 1942.

(Seal)

Henry Van Arsdale,
Acting Commissioner of Patents.